(12) United States Patent
Waters et al.

(10) Patent No.: US 6,611,776 B2
(45) Date of Patent: Aug. 26, 2003

(54) SIGNAL QUALITY MEASUREMENT

(75) Inventors: John Deryk Waters, Bath (GB); John Brassil, Los Gatos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/833,057

(22) Filed: Apr. 12, 2001

(65) Prior Publication Data

US 2002/0152042 A1 Oct. 17, 2002

(51) Int. Cl.[7] .............................................. G01R 13/00
(52) U.S. Cl. ........................... 702/69; 455/41; 455/502; 370/913
(58) Field of Search .............................. 702/69; 455/41, 455/502; 370/913

(56) References Cited

U.S. PATENT DOCUMENTS

| 6,026,301 | A | * | 2/2000 | Satarasinghe | 455/436 |
| 6,075,442 | A | * | 6/2000 | Welch | 340/539 |
| 6,137,994 | A | * | 10/2000 | Alterman et al. | 455/69 |
| 6,275,707 | B1 | * | 8/2001 | Reed et al. | 342/357.1 |

* cited by examiner

*Primary Examiner*—John Barlow
*Assistant Examiner*—Anthony T. Dougherty

(57) ABSTRACT

A signal quality parameter in a wireless network supporting plural network user devices is measured. Each user device measures a predetermined signal quality parameter of signals received from each of the other user devices in the network. Each user device broadcasts the measurements to other user devices in the network. Each user device calculates, for each of the other user devices, a value for the predetermined signal quality parameter from all the received measurements associated with that other user device.

14 Claims, 1 Drawing Sheet

SIGNAL QUALITY MEASUREMENT

BACKGROUND OF THE INVENTION

This invention relates to apparatus for, and a method of, measuring signal quality, and in particular to signal strength measurement in a piconet.

Short-range wireless networks (known as piconets) are used to interconnect mobile phones, computers and personal digital assistants (PDAs) with each other, and with home and business telephones using a short-range wireless connection. One well known protocol of this type is the Bluetooth protocol which operates at 2.45 Ghz. The maximum range of Bluetooth is 10 m, and data can be exchanged at a rate of 1 megabits per second (later generations will run at higher data rates). With Bluetooth, a piconet can support up to eight simultaneous devices, namely one master unit and seven slave units. This type of piconet can dynamically change as users enter and leave the range of the Bluetooth master unit.

Another known short-range wireless protocol is the wireless networking protocol IEEE802.11. Devices constructed in accordance with this protocol operate at 2.45 GHz, and a piconet can support a very large number of users. As with the Bluetooth, such a piconet can dynamically change as users enter and leave the piconet.

In order to co-ordinate such an ad-hoc network, it is desirable that prior notification is given of a network member's intention to leave the network, so that any necessary changes in the management of the network can be made prior to the departure of that member. This is particularly important where members of a piconet share each others wide area network (WAN) interfaces in a co-ordinated fashion to obtain a single, logical, higher-speed WAN connection. An example of this is the streaming of video to a single user of a piconet by utilising the WAN connections of a number of other members of the piconet. This application is described in the specification of our co-pending U.S. patent application Ser. No. 09/809,427, filed Mar. 16, 2001, incorporated herein in its entirety by reference.

One way of determining whether a network member intends to leave the network is to measure the strength of signals received from that member. Thus, where the received signal strength from such a network member continually decreases towards the point of non-reception, it can be surmised by other members of the network that that member is intending to leave. Unfortunately, received signal strength depends on the propagation path of that signal and the environment, and this can vary considerably, particularly in a piconet. This is particularly the case where the piconet is positioned within a room, where the walls can give rise to spurious reflected signals. In such a situation, it is quite possible that one network member will receive signals from another network member which gradually decrease, even though that member is not intending to leave the network, the continually decreasing signal strength arising because of the relevant propagation path and the environment concerned.

SUMMARY OF THE INVENTION

The aim of the invention is to provide a method of measuring signal quality (such as signal strength) which gives a more reliable measurement of the signal quality concerned.

The present invention provides a method of measuring a signal quality parameter in a wireless network supporting a plurality of network user devices, the method comprising the steps of:

each user device measures a predetermined signal quality parameter of signals received from each of the other user devices in the network;

each user device broadcasts the measurements so made to said other user devices; and each user device calculates, for each of the other user devices, a value for the predetermined signal quality parameter from all the received measurements associated with that other user device.

In a preferred embodiment, wherein the network is a short-range network, each user device has a receiver and a transmitter for short-range communication with the other user devices, and a processor for calculating said values.

Advantageously, the signal quality parameter is the signal strength, and each user device includes a combiner for combining the plurality of measurements associated with each of the other user devices. Preferably, each user device is such as to calculate the average of the plurality of measurements associated with each of the other user devices.

In a preferred embodiment, the method further comprises the step of determining that any given user device is about to leave the network by comparing said value of the signal strength of that user with a predetermined low level signal strength.

The invention also provides a wireless communications device comprising a transmitter, a receiver, a processor, an arrangement for measuring a signal quality parameter of signals received from other wireless communication devices, and a combiner arrangement for calculating a value for said parameter, for each of a plurality of said other communications devices, from the measurements so made and from other measurements of that parameter of that communications device made by said other communication devices and received by said receiver.

Advantageously, the transmitter and the receiver are short-range devices, and preferably form part of a Bluetooth transceiver.

In a preferred embodiment, the measuring arrangement includes a detector for measuring the strength of signals received.

The invention further provides a method of managing a wireless network supporting a plurality of network user devices, the method comprising the steps of:

at each user device, measuring a predetermined signal quality parameter of signals received from each of the other user devices in the network;

at each user device, broadcasting the measurements so made to said other user devices; and managing the network using the broadcast measurements.

BRIEF DESCRIPTION OF THE DRAWINGS

The invention will now be described in a greater detail, by way of example, with reference to the drawings, in which.

DETAILED DESCRIPTION OF THE PREFERRED EMBODIMENTS

Figure 1:
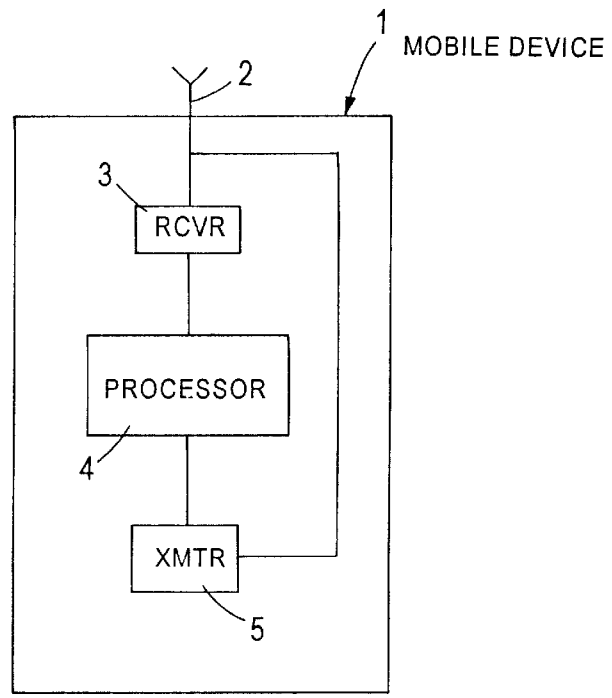
FIG. 1 is a schematic representation of a mobile device.

Referring to the drawings, FIG. 1 shows schematically various components of a mobile device 1, namely an antenna 2, a receiver 3, a processor 4, and a transmitter 5. The receiver 3, together with its companion antenna 2, is designed to receive signals at 2.45 GHz in accordance with the short-range networking protocol being used, and the transmitter 5 is arranged to transmit signals at this frequency. The mobile device may also include an antenna, a receiver and a transmitter (none of which are shown) for communication with a base station (not shown) of a mobile telecommunications network such as the GSM system (global system for mobile communications).

Figure 2:
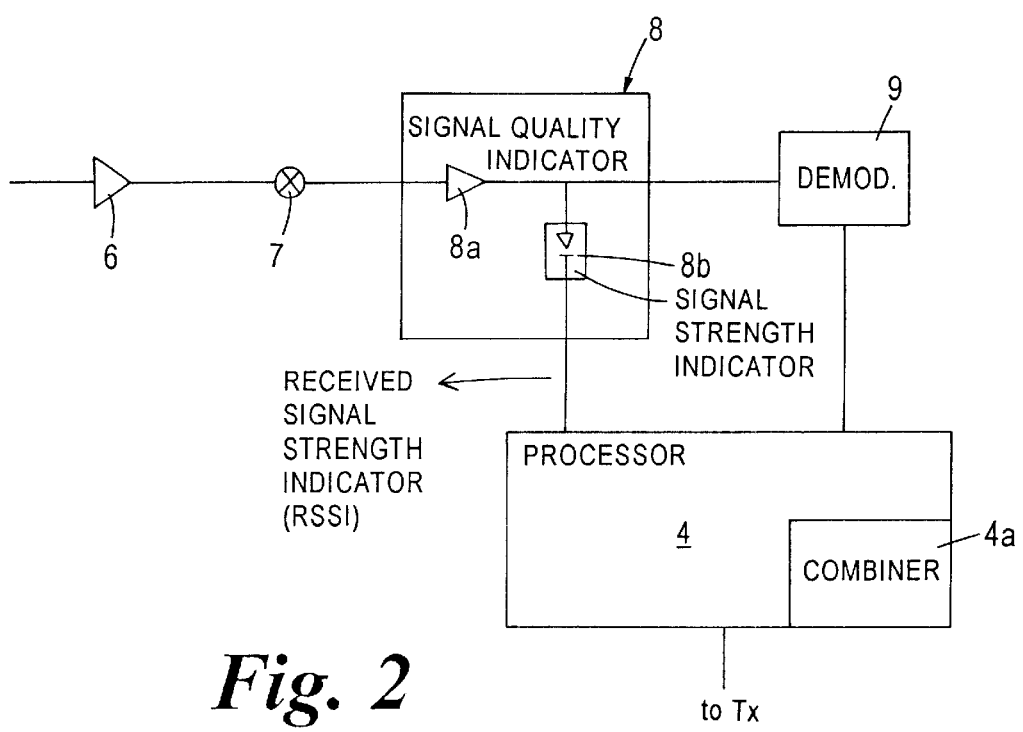
FIG. 2 is a schematic representation of the receiver and the processor of the handset of FIG. 1.

As shown in FIG. 2, a conventional receiver 3 might comprise an amplifier 6, a mixer 7, a signal quality indicator 8, and a demodulator 9. The indicator 8 includes an intermediate frequency amplifier 8a and circuitry 8b for measuring the strength of the incoming signal level. The outputs of the demodulator 9 and the circuitry 8b are fed to the processor 4. The mixer 7 converts the 2.45 GHz signals to signals at 6 MHz (although other frequencies may be appropriate dependent upon the design requirements of the receiver 3). The demodulator 9 outputs data signals to the processor 4. The output of the detector 8b is the measure of the output voltage of the amplifier 8a, and is indicative of the received signal strength indicator (RSSI) of a signal received by the antenna 2. The processor 4 includes a combiner 4a, the purpose of which will be discussed in greater detail below. The processor 4 is programmed to control the combiner 4a, again as is discussed below.

When the user of the mobile device 1 forms part of an ad-hoc piconet together with other users of mobile devices constructed in accordance with the invention, each user can determine the signal strength of each other user in the following manner. Thus, each user measures the received signal strength from every other user in the piconet at any given moment. For example, the user of the mobile device 1 measures the RSSI of the signals picked up by its antenna 2 from each of the other mobile devices presently in the piconet. Each user then broadcasts the measurements made to all other members of the piconet. The processor 4 of the mobile device 1 then uses its combiner 4a, under the control of its program, to combine all the RSSIs for each of the other users in turn, thereby arriving at a more accurate measurement of the signal strength of the mobile device of every other user of the piconet. Each of the other users of the piconet carries out the same process, so that all the users can build an estimate of each node's signal strength based on measurements from all nodes in the network, thus improving the accuracy of measurement.

By comparing the measured value of a given node's signal strength with a predetermined low level signal strength, each user of the piconet can determine, using its processor 4, that the user of that node is about to leave the piconet. Any necessary changes in the management of the network can then be made prior to the departure of that user.

The combiner 4a can be arranged to provide an average of the RSSIs received by the mobile device 1. Alternatively, the combiner 4a could take the median value of the RSSIs as the correct value of received signal strength. It would also be possible to use a more sophisticated algorithm for determining the best estimate of received signal strength.

Each of the RSSIs arriving at the mobile device 1 is in the form of a packet signal having an ID header portion and a value portion. Typically, the ID portion uses 3-bits and the value portion uses 8-bits. The packets are, therefore, relatively short, so that the combiner 4a can rapidly calculate the correct received signal strength from all the packets received. In this way, the measurement process can be repeated at very short intervals, say every 20 m/s.

It will be apparent that modifications could be made to the arrangement described above. Thus, by providing a different form of detector 8b, a different signal quality parameter could be measured. For example, the arrangement could be modified to measure distortion of received signals, and this would be particularly useful where a piconet is positioned within a metal-walled room. Similarly, the arrangement could be modified to measure the bit error rate of received signals, or any other parameter of a traffic channel.

It would also be possible to use the measured signal strength, or other signal quality, to instruct the sender of signals concerned to change the sending data rate, for example to increase the data rate where received signal strength has decreased, or a received signal has been subjected to increased distortion.

The invention could also be modified to operate with any other suitable short-range wireless protocol such as Bluetooth. In this case, the piconet can accommodate up to seven users each having a handset equipped with a Bluetooth slave unit. As with the earlier embodiment, each of the network members measures the signal strength from each of the other network members, and transmits this information using its Bluetooth slave unit to the Bluetooth master unit. The master unit then transmits all the information regarding received signal strengths to all members of the network, so that each member of the network can build an estimate of each node's signal strength based on measurements from all nodes in that network, thereby improving the accuracy of the measurement.

What is claimed is:

1. A method of managing a wireless network supporting a plurality of network user devices, the method comprising the steps of:
   at the site of each user device, measuring a predetermined signal quality parameter of signals received from each of the other user devices in the network;
   at the site of each user device, broadcasting the measurements so made to said other user devices; and
   managing the network using the broadcast measurements.

2. A method as claimed in claim 1, wherein the measuring and broadcasting steps performed at the site of each user device are performed by each respective user device.

3. A method of measuring a signal quality parameter in a wireless network supporting a plurality of network user devices, the method comprising the steps of:
   at the site of each user device, measuring a predetermined signal quality parameter of signals received from each of the other user devices in the network;
   at the site of each user device, broadcasting the measurements so made to each of said other user devices;
   at the site of each user device, calculating for each of the other user devices, a value for the predetermined signal quality parameter from the measurement of said parameter associated with that other user device made at the site of said user device and from all the measurements of said parameter made at the site of the other user device as received at the site of said user device from all the other user devices; and
   determining that any given user device is about to leave the network by comparing said value of the signal strength associated with that user with a predetermined low level signal strength.

4. A method as claimed in claim 3, wherein the measuring, broadcasting and calculating steps performed at the site of each user device are performed by each respective user device.

5. A wireless communications device comprising a transmitter, a receiver, a processor, an arrangement for measuring a signal quality parameter of signals received from other wireless communication devices, and a combiner arrangement for calculating a value for said parameter, for each of a plurality of said other communications devices, from the measurements so made and from other measurements of that parameter of that communications device made by said other communications devices and received by said receiver.

6. A device as claimed in claim 5, wherein the measuring arrangement includes a detector for measuring the strength of signals received by the receiver.

7. A device as claimed in claim 5, wherein the transmitter and the receiver are short-range devices.

8. A device as claimed in claim 7, wherein the transmitter and the receiver form part of a Bluetooth transceiver.

9. A method of measuring a signal quality parameter in a wireless network supporting a plurality of network user devices, the method comprising the steps of:

at the site of each user device, measuring a predetermined signal quality parameter of signals received from each of the other user devices in the network;

at the site of each user device, broadcasting the measurements so made to said other user devices; and at the site of each user device, calculating, for each of the other user devices, a value for the predetermined signal quality parameter (a) from the measurement of said parameter that was made at the site of the other user device and (b) from all the received measurements of said parameter made at the site of that other user device as received at the site of said user device from the sites of all the other user devices.

10. A method as claimed in claim 9, wherein the network is a short-range network, and each user device has a receiver and a transmitter for short-range communication with the other user devices, and a processor for calculating said values.

11. A method as claimed in claim 9, wherein the measuring, broadcasting and calculating steps performed at the site of each user device are performed by each respective user device.

12. A method as claimed in claim 9, wherein the signal quality parameter is the signal strength, and wherein at the site of each user device the plurality of measurements associated with each of the other user devices are combined.

13. A method as claimed in claim 12, wherein at the site of each user device the average of the plurality of measurements associated with each of the other user devices is calculated.

14. A method as claimed in claim 12, further comprising the step of determining that any given user device is about to leave the network by comparing said value of the signal strength of that user with a predetermined low level signal strength.

* * * * *